United States Patent Office 3,297,677
Patented Jan. 10, 1967

3,297,677
AZIRIDINYL AZO PIGMENTS
Roy A. Pizzarello, Mount Vernon, N.Y., and Alfred F. Schneid and John J. De Lucia, New Milford, N.J., assignors to Interchemical Corporation, New York, N.Y., a corporation of Ohio
No Drawing. Filed Apr. 15, 1964, Ser. No. 360,090
6 Claims. (Cl. 260—152)

This invention relates to new aziridinyl pigments. More particularly it relates to new organic azo pigments containing certain imine groups capable of reacting with textile fibers and with certain reactive polymers and thus enhancing the fastness properties of the textiles so colored.

This application is a continuation-in-part of our prior and copending applications Serial No. 62,827, filed October 17, 1960; Serial No. 62,856, filed October 17, 1960; and Serial No. 62,873, filed October 17, 1960, now abandoned.

Reactive dyestuffs are already known. They are colored compounds containing atoms or groups of atoms capable of reacting with fibers. They are water soluble and are used mainly on cellulosic fibers, although application to silk, wool, and nylon have been mentioned. The unreacted dyestuff should preferably have little affinity for the fibers so that the surplus can be washed away. Alkali is required when the reaction splits off acid, for example when the reactive atom is chlorine. Compounds containing triazine radicals with chlorine or bromine attached directly to a triazine ring or to a pyrimidyl radical form one class of commercially available reactive dyestuffs. Others contain the radicals betahalogenopropionyl, beta-halogenoethylsulfonyl, chloroacetylamino, alkyl phosphite, beta - hydroxyethylsulfonyl, beta - (chloromethyl)-beta-sulfatoethylsulfonyl, and sulfone fluoride.

We have now made water-insoluble colored organic pigments containing the aziridine ring, which can react with textile fibers and with reactive groups present in polymeric materials. We synthesized many such pigments by utilizing the reactive hydrogen atom present in imines, the desired reactivity of the end products being due to eventual opening of the imine rings. When the imine ring opens a carbonium or an amide ion is formed and these ions are capable of reacting with other imines to form polymers or with other groups to form addition compounds. Through the ring-opening reaction the imine colorants can be made to react with the fibers and with polymeric materials containing certain reactive groups such as COOH, $CONH_2$, OH, $NH_2$, etc.

We have prepared in excellent yields various water-insoluble colored organic azo pigments, each pigment containing at least one methyl aziridinyl group attached by means of —CO—, —NHCO—, —$SO_2$—, and —$NCOCH_2CH_2$—.

Examples of such pigments are compounds represented by the formulas

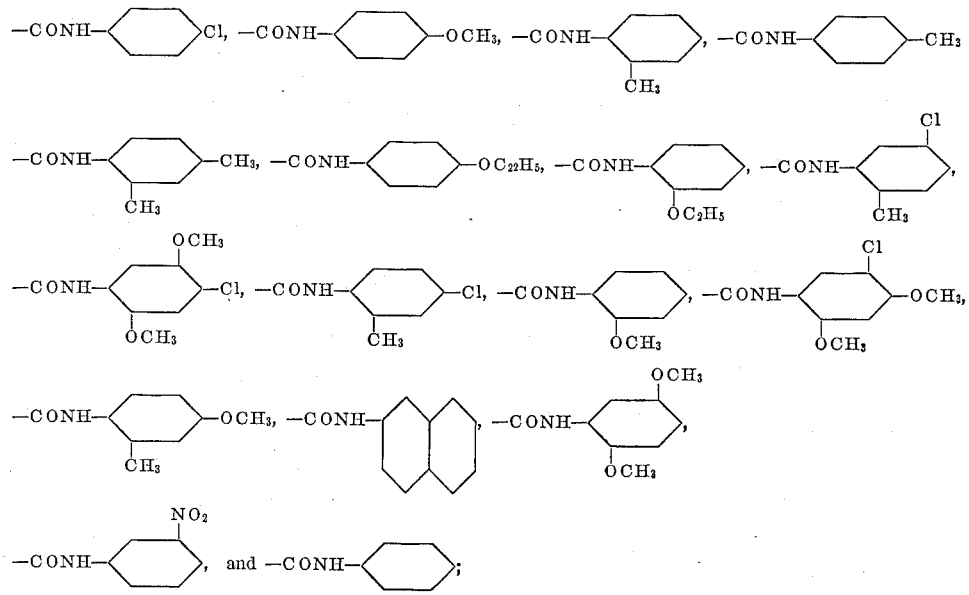

where $R_1$ is selected from the group consisting of —COZ, —$SO_2Z$, $R_2$ is selected from the group consisting of —H and —$SO_2Z$; X is selected from the group consisting of —H, —$CH_3$, —$OCH_3$, —Cl, —$NO_2$ and —COZ; and Z is $$-N\diagdown_{CHCH_3}^{CH_3}$$

the number of propylenimine groups present being one to two;

$$R_1-\langle\phantom{x}\rangle-N=N-\langle\phantom{x}\rangle-R_2$$

where $R_1$ is selected from the group consisting of —NHCOZ, —$NHCOCH_2CH_2Z$, —$SO_2Z$, and —COZ; $R_2$ is selected from the group consisting of $R_1$, $NO_2$, and H; and Z is $$-N\diagdown_{CHCH_3}^{CH_2}$$

(C) a water-insoluble colored organic azo pigment having the formula $$R-N=N-\langle\phantom{x}\rangle-\langle\phantom{x}\rangle-N=N-R$$

where X is selected from the group consisting of Cl, OCH₃, CH₃, NO₂, and H; and R is a member selected from the group consisting of

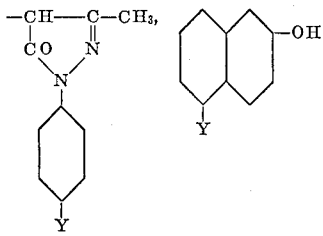

and

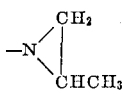

Y is selected from the group consisting of —SO₂Z, —NHCOCH₂CH₂Z, —NHCOZ, and —COZ; and Z is

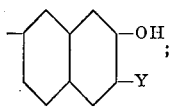

(D) a water-insoluble colored organic azo pigment having the formula

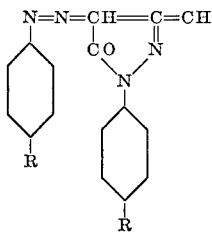

where R is selected from the group consisting of H and

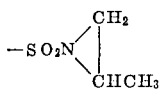

the number of propylenimine groups present being one to two; and (E) a water-insoluble colored organic azo pigment having the formula

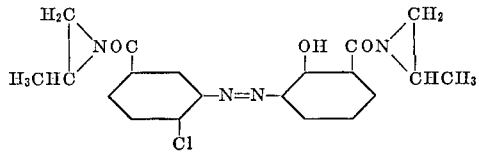

While these pigments are illustrative of the invention, it will be understood that there are many other embodiments of the type of reactive aziridine pigments disclosed herein.

Of the pigments included, it may be noted that those having one or more aziridinyl groups attached to the dyestuff nucleus by means of an acrylamide linkage have the advantage of being made by an addition reaction and consequently no by-products are formed. This eliminates the need for additional purification steps when high-purity pigments are desired.

These pigments may be applied to textiles by printing and padding, the finished materials having enhanced resistance to laundering and drycleaning. If the printing paste contains a resin that reacts with the imine group, such as a carboxyl-containing butadiene acrylonitrile latex, the finished textile will be even more wash resistant.

The imine groups probably react with the textile fibers as well as with reactable resins or thickners. Even in the absence of a binder the pigments can be fixed to the fibers, although a binder improves the print with respect to fastness and depth of shade.

The examples that follow are given as illustrations but not as limitations. Parts are parts by weight unless stated to be otherwise.

*Example 1*

475 g. of 2-hydroxy naphthalene 3-carboxylic acid and 1 liter of benzene were refluxed to remove the water and cooled to 50° C. 240 g. thionyl chloride were added over a period of 45 minutes and the mixture heated 4 hours at its reflux temperature of 80° C. After standing overnight at room temperature, it was cooled and filtered at 10° C., washed with petroleum ether, and dried. The product was a yellow powder melting at 92–94° C. (2-hydroxy naphthalene=3-carbonyl chloride). 20.5 g. of this product were added over a period of half an hour to a solution of 6.2 g. propylenimine and 11.0 g. of sodium carbonate in 250 ml. water, the temperature rising to 30° C. The reaction mixture was heated to 45° C. for 2 hours, filtered hot, washed free of alkali with water, and dried at 50° C. The tan colored product had a melting point of 67–69° C. and a nitrogen content of 6.03%. 2-hydroxy naphthalene-3-methyl aziridinyl carbamide contains 6.17% nitrogen.

*Example 2*

To 70 g. of pigment, made by reacting 2-methoxy-4-chloroaniline with 2-hydroxy naphthalene 3-carboxylic acid in 1 liter of chlorobenzene, were added 60 g. of thionyl chloride and the mixture refluxed for 6 hours, the evolution of HCl having ceased by the end of this period. The mix was cooled and filtered. Drying at 60° C. yielded a product containing 19.8% chlorine and 7.8% nitrogen. 18.6% chlorine and 7.7% nitrogen are present in 1 - (2' - methoxy - 5 - chlorophenyl azo)-2-hydroxy naphthalene-3-carbonyl chloride. A solution of 6.5 g. propylenimine and 10.2 g. sodium carbonate in 100 ml. water was heated to 45° C. and 30 g. of the above acid chloride were added over a half hour period and the heating was then maintained at 45° C. for 2 hours. The filter cake was washed free of alkali with water and dried. 23 g. of red powder were obtained.

*Example 3*

143 g. of finely divided pigment made by reacting 2-chloro-5-carboxy aniline with 2-hydroxy naphthalene-3-carboxylic acid and 600 ml. nitrobenzene were heated to 65° C. 80 ml. thionyl chloride were added over a period of 2 hours. The mix was then heated at 140° C. until the evolution of HCl ceased, approximately 4 hours being necessary. After the mass had cooled to room temperature it was filtered and washed with 200 ml. of ligroin. 110 g. of red powder were obtained. 20 g. of this material were added over a 4-hour period to a solution of 6.2 g. propylenimine and 10.6 g. sodium carbonate in 300 ml. water at 26° C. The mixture was heated two hours at a temperature of 44° C., filtered, washed until the wash water was colorless and free from alkali. The dried filter cake weighed 24 g. It was bright red powder.

*Example 4*

67 g. of 1-(4'-nitro phenyl-azo)-2-hydroxy naphthalene-3-carboxylic acid, 500 g. of chlorobenzene, and 30 g. thionyl chloride were heated up to the reflux temperature over a period of 3 hours. Refluxing was continued for 14 hours, at which time the evolution of HCl had ceased. The reaction mixture was evaporated under vacuum to two-thirds of its original volume and cooled to 15° C. It was filtered, the filter cake washed with benzene and dried under vacuum. 50 g. of red powder were obtained. 48 g. of the above acid chloride were added over a period of one half hour to a solution of 5.7 g. propylenimine and 16.8 g. sodium bicarbonate in 125 ml. water at a temperature of 35° C. The mixture was then heated 3 hours at 55° C., filtered hot, washed free of alkali with water, and oven dried. 46.5 g. of red powder were obtained.

*Example 5*

30.4 g. 4-nitro-2-amino toluene and 57.0 ml. hydrochloric acid of 20° Bé. in 250 ml. water were stirred half an hour and then cooled down to 0° C. with ice and water. 14.5 g. sodium nitrite were added as a 30% solution. The mixture was stirred one hour at 0–5° C. and then 28 ml. of 80% acetic acid added. After 5 to 10 minutes of additional stirring it was clarified with 5 g. nuchar and 5 g. filter cel. The diazo solution was then divided into 3 equal portions to be used in the next 3 examples.

*Example 6*

One of the 3 portions of diazo solution prepared by the method of Example 5 was added dropwise at 0° C. to a coupling bath of 15.2 g. of 2-hydroxy-3-naphthalene methyl aziridinyl carbamide and 21.2 g. of sodium carbonate in 1500 ml. water, stirred one hour, filtered, washed free of alkali, and dried. 21.5 g. of the red powder 1-(2′-methyl-5-nitrophenyl azo)-2-hydroxy naphthalene-3-methyl aziridinyl carbamide were obtained.

*Example 7*

One of the 3 portions of diazo solution prepared by the method of Example 5 was added dropwise at 0° C. to a coupling bath of 16.35 g. of 2-hydroxy-3-naphthalene isopropanol-amide and 21.2 g. of sodium carbonate in 1500 ml. water. The mixture was stirred on hour, filtered, washed free of alkali, and dried. 30.6 of the red powder 1-(2′-methyl-5-nitro phenyl azo)-2-hydroxy naphthalene-3-isopropanolamide were obtained.

*Example 8*

One of the 3 portions of diazo solution prepared by the method of Example 5 was added dropwise at 0° C. to a coupling bath of 12.55 g. of 2-hydroxy naphthalene-3-carboxylic acid and 21.2 g. sodium carbonate in 1500 ml. water. The mixture was stirred one hour, filtered, washed free of alkali, and dried. 20.6 g. of the red powder 1-(2′-methyl-5-nitro phenyl azo)-2-hydroxy naphthalene carboxylic acid sodium salt were obtained.

The compounds in Examples 7 and 8, which were free from imine rings yielded textiles having less wash resistance than textiles colored with the imine compound described in Example 6.

*Example 9*

450 g. of chlorobenzene were cooled to −7° C. and phosgene led into it through a delivery tube dipping below the surface of the liquid. After about 2 hours 67 g. of phosgene were absorbed. Without further cooling 54.7 g. para amino azobenzene were added over a period of 5 minutes. The mixture was then stirred 1½ hours until the temperature rose to 30° C. While bubbling phosgene in as before, the material was heated to 100° C. over a 3-hour period and then allowed to stand overnight. It was reheated to 95° C. and held there until very little HCl was being evolved. Nitrogen was passed in for 1 hour. The chlorobenzene was distilled off at 25 mm. and 36° C. until a thick paste remained. This was extracted with 3 portions of petroleum ether and the combined extracts evaporated to dryness. The residue was recrystallized from petroleum ether, yielding 26 g. of yellowish red powder containing 70.24% C, 3.85% H, and 18.69% N. Azobenzene-4-isocyanate has 70.2% C, 4.3% H, and 18.8% N. 250 ml. of petroleum ether were cooled to 10–15° C. 22.3 g. of the above isocyanate were added at once followed by 5.1 g. propylenimine. The mixture was stirred half an hour at 10–15° C. and 5.0 g. more of propylenimine added. It was heated to reflux temperature over a period of 1 hour and held there 2½ hours longer, filtered, and washed with 250 ml. of petroleum ether. 25.5 g. of light yellow powder were obtained.

*Example 10*

92 g. of the finely ground azo dyestuff made by coupling sulfanilic acid and sulfophenylmethyl pyrazolone were added to 500 ml. dimethyl formamide. 71 ml. $SOCl_2$ were added over a period of ½ hour, the temperature rising from 21° C. to 30° C. At 30° C. it was stirred 1 hour more, cooled to room temperature, filtered, washed free of acid with small portions of ice water, and dried. 80.0 g. of a yellow crystalline powder were obtained and found to contain 11.27% N and 15.17% Cl. Theoretically the disulfone chloride compound should have 12.09% N and 15.1% Cl. To make the disulfonimide, a mixture of 1 liter dioxane, 32 g. sodium carbonate in 150 ml. water, and 38 g. propylenimine were stirred together for about 1 hour. Then 132 g. of the disulfone chloride prepared as described above, were added and heated at 50° C. for 14 hours. The reaction mass was next drowned in 3 liters of cold water, filtered, washed free of alkali and oven dried at 50° C. 120 g. of yellow pigment were obtained with a nitrogen content of 14.19% compared with a theoretical nitrogen content of 14.47%.

*Example 11*

180 g. of finely divided pigment made by reacting dianisidine with 2-hydroxynaphthalene-6-sulfonic acid were added to 500 ml. chlorobenzene followed by the addition of 37 ml. dimethyl formamide. 41 ml. of thionyl chloride were added in such a way that the temperature did not exceed 65° C. The reaction temperature was held at 65° C. for 4 hours and then raised to 123° C. and maintained there until the evolution of HCl ceased. The mix was cooled to 40° C., filtered and washed with chlorobenzene followed by petroleum ether. 190 g. of blue green powder were obtained. 37 g. of the blue green powder were added over a period of 1 hour to a solution of 10.4 g. triethylamine and 6.3 g. methyl aziridine in 500 ml. acetone. The mixture was heated at 43° C. for 16 hours, filtered, and washed with water. 23 g. of a blue green powder having nitrogen content of 9.76% were obtained. The compound bis-1,1′-(2″-dimethoxy diphenyl tetrazo)-2,2′-dihydroxy-6,6′-disulfomethyl aziridinyl diimide contains 10.1% N.

*Example 12*

110 g. finely divided pigment made in the usual manner by reacting 2-methyl-5-chlorophenyl diazonium chloride with 2-hydroxy naphthalene 3,6-disulfonic acid were added to 600 ml. of chlorobenzene. About 200 ml. of chlorobenzene were distilled off to remove traces of water. The mixture was cooled to 35° C. and 37 ml. of dimethyl formamide and 41.8 ml. of thionyl chloride were added over a 15-minute period. It was heated to 75° C. for half an hour and then cooled to 60° C., filtered, washed with benzene, and dried. 70 g. of product were obtained having a chlorine content of 21.60% and a nitrogen content of 5.70%. 1-(2′-methyl-5′-chlorophenyl azo)-naphthalene-3,6-disulfone chloride contains 21.11% chlorine and 5.70% nitrogen. 25 g. of this product were added to a solution of 6.4 g. propylenimine and 11 g. triethylamine in 500 ml. acetone. The mixture was heated 12 hours at 40° C. Almost complete solution was effected. The solution was filtered and treated with isopropyl ether until no more solid was formed. The substance was filtered and oven dried. 18 g. of red powder was obtained.

*Example 13*

75 g. of finely divided pigment made by the known coupling of 2-methyl-5-chlorophenyl diazonium chloride with 2-hydroxy naphthalene 6-sulfonic acid were added to 500 ml. of chlorobenzene in a 500-ml. 3-necked flask equipped with stirrer, condenser, and thermometer. 7.0 ml. of dimethyl formamide were added followed by 20 ml. of thionyl chloride. The mixture was slowly heated up to 126° C. and held there for two hours. While still hot the mass was filtered and the filtrate cooled to 15° C. The separated sulfone chloride was then filtered, washed with benzene followed by petroleum ether, and dried. 10 g. of the 1-(2'-methyl-5'-chlorophenyl azo)-2-hydroxy naphthalene-6-sulfone chloride was obtained. 40 g. of this product were added over a half-hour period to a solution of 6.2 g. propylenimine and 11.0 g. triethylamine in 500 ml. acetone. The mixture was then heated to 50° C., held there 3 hours, and filtered while still hot. The filter cake was washed with 200 ml. of water. 26.5 g. of red powder were obtained having a chlorine content of 8.50% and a nitrogen content of 10.39%. 8.5% chlorine and 10.1% nitrogen are theoretical for 1-(2'-methyl-5'-chlorophenyl azo)-2-hydroxy naphthalene-6-sulfomethyl aziridinyl imide.

*Example 14*

164 ml. chlorosulfonic acid were put into a 500 ml. 3-necked flask fitted with stirrer, condenser, and thermometer. 91 grams of azobenzene were added slowly over a half-hour period, while allowing the temperature to reach 73° C. When the addition was complete, the temperature was raised to 125° C. and held there two hours. The reaction mass was drowned in three liters of ice and water mixture, filtered, washed free of acid, and dried. 90 g. of azobenzene sulfonyl chloride were obtained.

2.0 parts of sodium hydroxide and 1.5 parts of propylenimine were added to 125 parts of water. The solution was at 27° C. 7.0 parts of azobenzene sulfonyl chloride were added over a 15 minute period and the mixture was then heated to 55° C. for one hour and cooled to 40° C. An additional 2.0 parts of sodium hydroxide and 1.5 parts of propylenimine were then added followed by 7.0 parts of azobenzene sulfonyl chloride and the mixture again heated one hour at 55° C. It was filtered hot, washed free of color and alkali with water, and dried. 14.0 parts of yellow powder were obtained containing 14.14% N. The theoretical amount of N in 4-methyl aziridinyl azobenzene sulfonimide is 14.20%.

*Example 15*

9.5 g. of triethylamine were added to a solution of 17 g. of 4-amino azobenzene and stirred 15 minutes during a period of half an hour. 8.0 g. acrylyl chloride in 30 ml. acetone were then added, the temperature rising from 30° up to 40° C. The mixture was stirred 2 hours at 40° C., filtered, and the filtrate drowned in 1 liter of water containing 15 ml. of concentrated hydrochloric acid. The resulting mixture was filtered and the residue washed with water until free from acid. It was air dried and then washed with petroleum ether. 11.0 g. of violet powder were obtained containing 71.52% C, 4.97% H and 16.44% N. 4-amino azobenzene acrylamide has 71.8% C, 5.2% H, and 16.7% N. 12 g. of the above product was dissolved in 150 ml. acetone at room temperature and a solution of 5.7 g. propylenimine in 20 ml. acetone was added dropwise over a period of 15 minutes. The mixture was stirred one hour at 25° C. and then heated up over a period of at least one hour to reach reflux temperature. Reflux was continued one hour. After the mixture stood overnight the acetone was distilled off under vacuum until the product crystallized out. It was filtered and washed with petroleum ether. 7.7 g. of yellow powder were obtained.

*Example 16*

24.2 g. 4-NO₂-4'-amino azobenzene in 350 ml. acetone was heated to reflux temperature and filtered hot. The filtrate was returned to the flask and 11.5 g. triethylamine added. It was then heated to 40° C. and 8 g. acrylyl chloride diluted with 30 ml. acetone was added over a half-hour period. The temperature was allowed to rise to 52° C. then heat was applied and the mix refluxed for 2 hours at 56° C. It was cooled to 40° C. and filtered to isolate triethylamine hydrochloride. The cake was washed with 2 50-ml. portions of acetone and the washings added to the filtrate. The combined acetone solutions were drowned in 2000 ml. water containing 30 ml. concentrated hydrochloric acid, stirred half an hour, filtered, washed with water, and dried. 21.5 g. of brownish red powder were obtained containing 59.65% C, 4.19% H, and 18.67% N. 4-nitro-4'-amino azobenzene acrylamide has 60.80% C, 4.06% H, and 18.90% N. 12 g. of the above product and 150 ml. acetone were stirred half an hour at room temperature. 4.6 g. propylenimine diluted with 15 ml. acetone were added dropwise over a period of 15 minutes, the temperature rising from 25° to 28° C. It was then heated 18 hours at 30° C. A small quantity of insoluble material was filtered off. To the filtrate was added 3 times its volume of petroleum ether. The acetone-ether solution was drowned in 500 ml. of cold water. The solid material that separated was recovered by filtration, washing with water, and drying. 8.9 g. of brown red powder was obtained having a nitrogen content of 19.63%. 4-nitro-4'-amino azobenzene-beta-(methyl aziridinyl) acrylamide contains 19.8% nitrogen.

*Example 17*

(A) An azo coupling was made of amino-para-toluic-acid and naphthol AS-E.

(B) A mixture of 190 gms. of this pigment and 1250 cc. of chlorobenzene was heated at reflux to remove water by azeotropic distillation. After it was cooled to 40° C., 75 cc. of dimethyl formamide were added and then over a period of 1 hour 55 cc. of thionyl chloride were added. The batch was gradually brought up to reflux temperature over a period of 2 hours and reflux was continued until 200 cc. aqueous material had been distilled off. The temperature was gradually lowered to 10° C. over a period of 3 hours. The product was filtered, washed with chloroform and petroleum ether, and dried overnight. The product weighed 107 gms. and had a melting point of 224–229° C.

(C) 85 gms. of this product were stirred 1 hour in a solution of 25 cc. of propylenimine, and 18 g. sodium carbonate in 850 cc. of water at 25° C. The batch was then warmed up to 45° C. and stirred 4 hours at that temperature. It was allowed to stand overnight at room temperature, then filtered, and washed free from alkali with warm water.

The product was

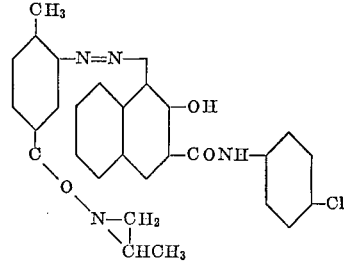

*Example 18*

(A) An azo coupling was made of amino-para-toluic acid and naphthol AS-RL.

(B) The acid chloride of this pigment was made in the same way as in the preceding example, as described there under (B). 89 g. of a product melting at 220–225° C. were obtained.

(C) The propylenimine derivative was prepared as described in the preceding example under (C).

The product was

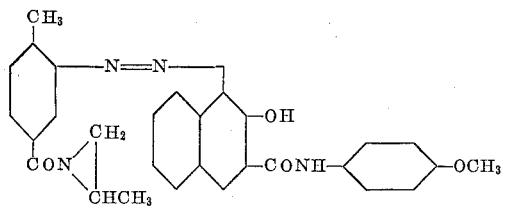

*Example 19*

(A) A slurry of 28.4 g. of 4-chloro-2-amino toluene in 80 cc. of 10N hydrochloric acid and 400 cc. of water was cooled to about —5 to 0° C. A solution of 15 g. sodium nitrite in 150 cc. water was added dropwise. The diazonium salt was completely soluble; the amine salt insoluble. The solution was decolorized and filtered.

(B) A solution of 37.6 g. of beta-oxynaphthoic acid in 44 cc. of 10N sodium hydroxide was added to a solution of 56.8 g. sodium bicarbonate in 500 cc. of water and made up to 1 liter with water.

(C) (B) was added to (A). After the reaction was complete, the batch was made acid to Congo red, filtered, and washed free of acid.

(D) The acid chloride was made by heating 34 g. of the above product, (C) and 135 g. chlorobenzene to 100° C. 14 g. thionyl chloride were added dropwise. The temperature was raised to 125° C. over a period of 1 hour. The product was filtered off, washed with benzene, and dried under vacuum at 70–80° C.

(E) A slurry of 35.8 g. of the above product (D) in 800 cc. benzene was slowly added to a solution of 4.3 g. of ethylenimine and 10.5 g. of triethylamine in 500 cc. benzene at 15–20° C. over a period of 1 hour. The batch was then stirred 2 hours, filtered, washed with benzene, and dried under vacuum at 40° C.

The product was

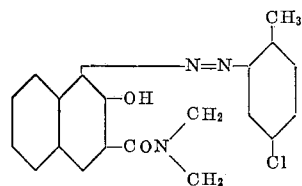

*Example 20*

4-nitro-2-aminoanisole was diazotized and coupled with beta-oxynaphthoic acid by the same procedure as in the preceding example. The acid chloride and the ethylenimine derivative were also made by the method described in the preceding example. The final product was

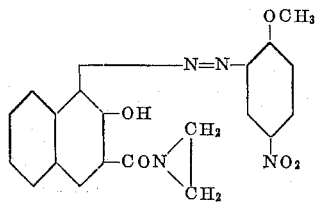

*Example 21*

(A) An azo coupling was made of dichlorobenzidine and para-aminopyrazolone.

(B) 13 g. of this pigment were stirred into a mixture of 100 cc. water and 130 cc. acetone and 7.2 g. sodium bicarbonate added. The batch was cooled to about —5 to 0° C. Over a period of ½ hour there was then added a solution of 4 g. acryloyl chloride in 5 cc. acetone. The temperature was held at about —5 to 0° C. for 2 hours, stirring constantly, and then allowed to reach room temperature over a period of 2 hours and stirred overnight. The product was filtered and washed free of alkali as in the preceding example. The product weighed 12.7 g. (dry).

(C) This material was stirred into a mixture of 100 cc. water and 100 cc. acetone at 25 to 30° C. and 4 drops of triethylamine added. Over a period of 1 hour a solution of 3 g. of propylenimine in 10 cc. of water was added. The batch was stirred overnight at 25 to 30° C. and then refluxed 8 hours. It was cooled, allowed to stand overnight, filtered, and washed free from alkali and propylenimine with water.

The product was

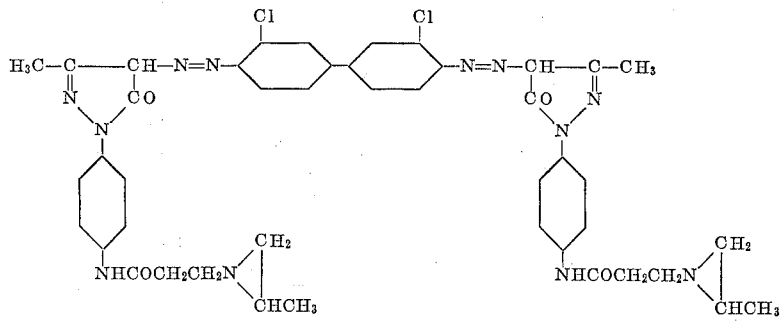

*Example 22*

To a slurry of 80 cc. of 10NHCl and 28.4 g. of 4-chloro-2-aminotoluene were added 400 cc. water and the mixture was cooled to about 0–5° C. 15 g. of NaNO₂ dissolved in 150 cc. water were added dropwise. The soluble diazonium salt was decolorized and filtered.

37.6 g. of beta-hydroxy naphthoic acid in 44 cc. of 10N sodium hydroxide were added to a solution of 56.8 g. of sodium bicarbonate in 500 cc. water and made up to one liter with water and then reacted with the above diazonium salt. The batch was made acid to Congo red, filtered, and washed free from acid. 34 g. of the pigment so obtained and 135 g. chlorobenzene were heated to 100° C. and 14 g. thionyl chloride added thereto dropwise. The temperature was raised to 125° C. over a period of one hour. The product was filtered off, washed with benzene, and vacuum dried at 70–80° C. 35.8 g. of this acid chloride was reacted with 4.3 g. of ethylenimine by making a slurry of the acid chloride in 800 cc. benzene and slowly adding the slurry to a solution of the imine in 500 cc. benzene and 10.5 g. triethylamine at 15–20° C. over a period of one hour. The mixture was stirred two hours more and then filtered, washed with benzene, and vacuum dried at 40° C.

*Example 23*

61.6 g. of 4-nitro-2-amino anisole were diazotized by slurrying with 160 cc. of 10NHCl, adding 500 cc. water and cooling to 0–5° C. A solution of 30 g. NaNO₂ in 300 cc. water was added dropwise to the amine salt slurry at 0–5° C. 75.2 g. of beta-hydroxynaphthoic acid was dissolved in 90 cc. of 10N sodium hydroxide were added to a solution of 113.6 g. sodium bicarbonate in 800 cc. water and made up to 1 liter with water. The diazonium salt was added slowly to the beta-hydroxynaphthoic acid salt. The mixture was made acid to Congo red, filtered, and washed free of acid. 61 g. of the product in 1200 cc. of chlorobenzene were heated to 70° C. 25 g. of thionyl chloride were added dropwise. The batch was heated to reflux over a period of 5 hours, filtered, washed with benzene, and vacuum dried at 60–65° C. 34 g. of the resulting acid chloride were stirred with 9.3 g. of triethylamine in 1200 cc. benzene. 3.8 g. of ethylenimine were slowly added at 10° C. The batch was then allowed to reach room temperature and it was stirred 3 hours more. The product was filtered, washed with benzene, and vacuum dried at 40° C.

What is claimed is:

1. A water-insoluble colored organic azo pigment selected from the group consisting of (A) a water-insoluble colored organic azo pigment having the formula

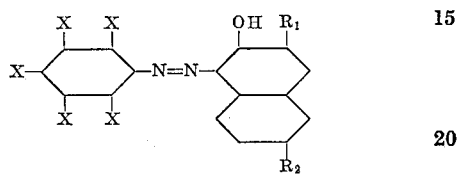

where $R_1$ is selected from the group consisting of —COZ, —SO$_2$Z, -CONH-⟨⟩-Cl, -CONH-⟨⟩-OCH$_3$, —CONH-⟨⟩(CH$_3$), —CONH-⟨⟩-CH$_3$, —CONH-⟨⟩(CH$_3$), —CONH-⟨⟩-OC$_2$H$_5$, —CONH-⟨⟩(OC$_2$H$_5$), —CONH-⟨⟩(Cl)(CH$_3$), —CONH-⟨⟩(OCH$_3$)(OCH$_3$)-Cl, —CONH-⟨⟩(OCH$_3$)(CH$_3$)-Cl, —CONH-⟨⟩(OCH$_3$)-Cl(OCH$_3$), —CONH-⟨⟩(OCH$_3$)-OCH$_3$, —CONH-⟨⟩(CH$_3$)-OCH$_3$, —CONH-⟨naphthyl⟩, —CONH-⟨⟩(OCH$_3$)(OCH$_3$), —CONH-⟨⟩(NO$_2$), and

—CONH-⟨⟩

$R_2$ is selected from the group consisting of —H and —SO$_2$Z; X is selected from the group consisting of —H, —CH$_3$, —OCH$_3$, —Cl, —NO$_2$, and —COZ; and Z is

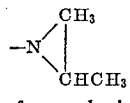

the number of propylenimine groups present being one to two;

(B) a water-insoluble colored organic azo pigment having the formula

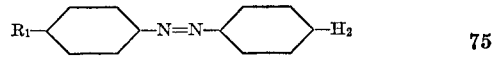

where $R_1$ is selected from the group consisting of —NHCOZ, —NHCOCH$_2$CH$_2$Z, —SO$_2$Z and —COZ;

$R_2$ is selected from the group consisting of $R_1$, NO$_2$, and H; and Z is

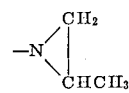

(C) a water-insoluble colored organic azo pigment having the formula

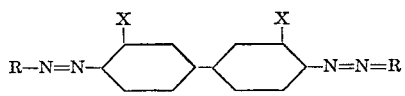

where

X is selected from the group consisting of Cl, OCH$_3$, CH$_3$, NO$_2$, and H; and R is a member selected from the group consisting of

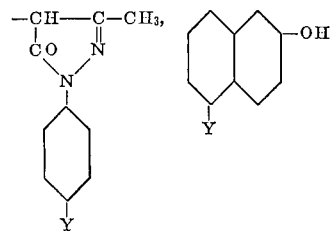

and

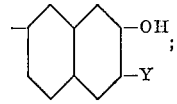

Y is selected from the group consisting of —SO$_2$Z, —NHCOCH$_2$CH$_2$Z, —NHCOZ, and —COZ; and Z is

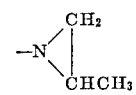

(D) a water-insoluble colored organic azo pigment having the formula

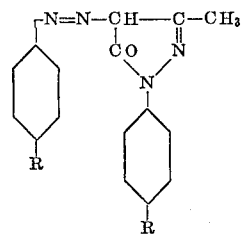

where

R is selected from the group consisting of H and

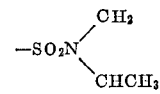

the number of propylenimine groups present being one to two; and (E) a water-insoluble colored organic azo pigment having the formula

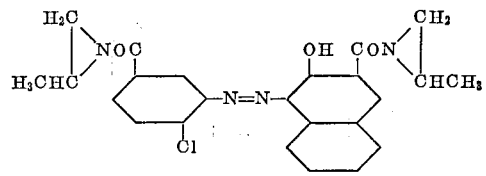

2. A water-insoluble colored organic azo pigment as defined under (A) in claim 1.
3. A water-insoluble colored organic azo pigment as defined under (B) in claim 1.
4. A water-insoluble colored organic azo pigment as defined under (C) in claim 1.
5. A water-insoluble colored organic azo pigment as defined under (D) in claim 1.
6. A water-insoluble colored organic azo pigment as defined under (E) in claim 1.

References Cited by the Examiner

UNITED STATES PATENTS 3,035,043  5/1962  Benz et al. _____ 260—152

FOREIGN PATENTS 884,446  4/1943  France.

CHARLES B. PARKER, *Primary Examiner.*

F. D. HIGEL, *Assistant Examiner.*

UNITED STATES PATENT OFFICE
CERTIFICATE OF CORRECTION

Patent No. 3,297,677                                            January 10, 1967

Roy A. Pizzarello et al.

It is hereby certified that error appears in the above numbered patent requiring correction and that the said Letters Patent should read as corrected below.

Column 2, line 13, before the formula insert -- (A) --; line 56, before the formula insert -- (B) --; column 4, line 2, for "thickners" read -- thickeners --; column 5, line 35, for "on" read -- one --; column 9, lines 53 to 59 in the formula the aziridine ring should be completed with a line from "$CH_2$" to "$CH_2$"; column 12, lines 60 to 63, the formula should appear as shown below instead of as in the patent:

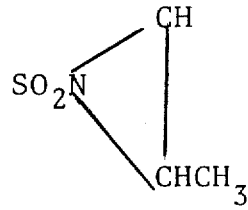

Signed and sealed this 24th day of October 1967.

(SEAL)
Attest:

EDWARD M. FLETCHER, JR.                          EDWARD J. BRENNER
Attesting Officer                                Commissioner of Patents